(12) United States Patent
Spasov et al.

(10) Patent No.: US 12,500,871 B2
(45) Date of Patent: Dec. 16, 2025

(54) NETWORK ENCRYPTION BASED ON TRAFFIC BETWEEN SOURCE AND DESTINATION

(71) Applicant: Oracle International Corporation, Redwood Shores, CA (US)

(72) Inventors: Nencho Spasov Spasov, Chesterfield, MO (US); Peter Michael Thornewell, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 171 days.

(21) Appl. No.: 18/374,308

(22) Filed: Sep. 28, 2023

(65) Prior Publication Data

US 2025/0112898 A1 Apr. 3, 2025

(51) Int. Cl.
*H04L 9/40* (2022.01)
(52) U.S. Cl.
CPC .......... *H04L 63/0428* (2013.01); *H04L 63/16* (2013.01)
(58) Field of Classification Search
CPC .... H04L 63/0428; H04L 63/166; H04L 63/16
USPC ....................................................... 713/168
See application file for complete search history.

(56) References Cited

U.S. PATENT DOCUMENTS

| | | | | |
|---|---|---|---|---|
| 8,186,026 B2* | 5/2012 | Xiang | ................. | H04L 63/0272 |
| | | | | 713/168 |
| 8,504,822 B2* | 8/2013 | Wang | ................. | H04L 63/0823 |
| | | | | 726/11 |
| 8,775,790 B2* | 7/2014 | Hidle | ................. | H04L 63/1408 |
| | | | | 713/153 |
| 2008/0059788 A1* | 3/2008 | Tardo | ................. | H04L 63/0428 |
| | | | | 713/153 |
| 2009/0113202 A1* | 4/2009 | Hidle | ................. | H04L 63/0428 |
| | | | | 713/153 |
| 2013/0091352 A1* | 4/2013 | Patel | ................... | H04L 63/0428 |
| | | | | 713/175 |
| 2023/0137255 A1* | 5/2023 | Mestery | .............. | H04L 12/4633 |
| | | | | 713/151 |

* cited by examiner

*Primary Examiner* — Amare F Tabor
(74) *Attorney, Agent, or Firm* — Kilpatrick Townsend & Stockton LLP

(57) ABSTRACT

The present disclosure relates to intelligent network encryption of traffic between a source and a destination. In an example, a network element receives, during a session between the source and the destination, first traffic exchanged between the source and the destination. The network element determines whether a traffic exchange between the source and the destination is expected to be secured by at least one of the source or the destination at any of a network layer, a transport layer, or an application layer. The network element generates a decision whether to secure the first session at the network layer based on whether the traffic exchange is expected to be secured or unsecured. The network element implements the decision on at least one of the first traffic or second traffic exchanged between the source and the destination during the first session.

20 Claims, 12 Drawing Sheets

NETWORK ENCRYPTION BASED ON TRAFFIC BETWEEN SOURCE AND DESTINATION

BACKGROUND

The present disclosure relates to intelligent network encryption of traffic between a source and a destination.

A source and a destination can be different computing nodes connected via a data network, such as the Internet, a local area network, a wide area network, etc. Communications between the source and the destination can be secured using different mechanisms, including encryption.

In certain examples, at least one of the source or the destination belongs to a cloud network hosted on a cloud infrastructure. A cloud infrastructure, such as Oracle Cloud Infrastructure (OCI), can provide a set of complementary cloud services that enable enterprises to build and run a wide range of applications and services in a highly available hosted environment. The cloud infrastructure can offer high-performance compute, storage, and network capabilities in a flexible overlay virtual network that runs on top of the physical underlay network and that is securely accessible from multiple locations (e.g., a public network, a private network, an on-premise network, etc.).

Virtual networking is a foundation for cloud infrastructures and cloud applications because virtual networking enables the ability to access, connect, secure, and modify cloud resources. Virtual networking enables communication between multiple computers, virtual machines (VMs), virtual servers, or other devices across different physical locations. While physical networking connects computer systems through cabling and other hardware, virtual networking uses software management to connect computers and servers in different physical locations over the Internet. A virtual network uses virtualized versions of traditional network components, such as network switches, routers, and adapters, allowing for more efficient routing and easier network configuration and reconfiguration. Entities, such as customers and service providers, can configure private networks that are deployed on a cloud infrastructure. Such private networks can be referred to also as virtual private networks or virtual cloud networks.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
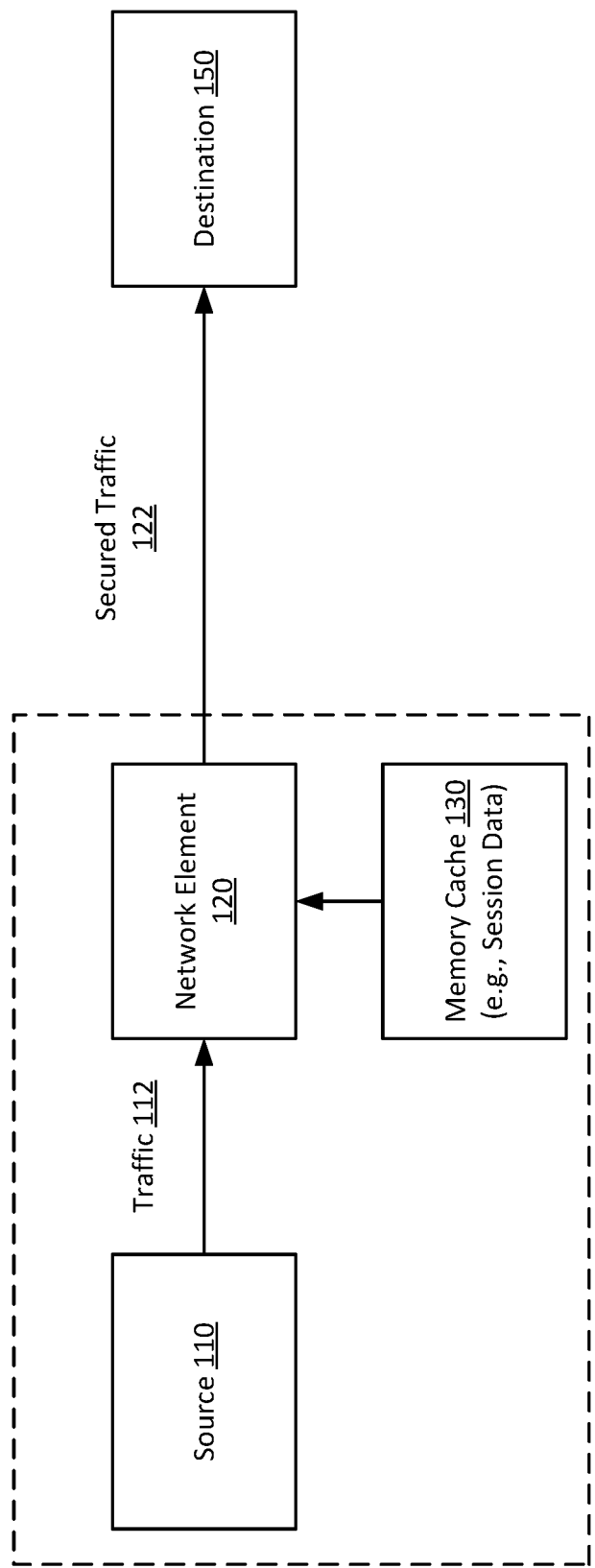
FIG. 1 illustrates an example computer environment that enables securing traffic between a source and a destination, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Embodiments of the present disclosure relate to intelligent network encryption of traffic between a source and a destination. In an example, a network element can determine whether the traffic is already secured or not. In this example, consider the use case where the traffic is sent by the source. In this use case, the source can secure the traffic by using encryption at any or a combination of a network layer (e.g., Layer 3 of the Open Systems Interconnection (OSI) model), a transport layer (e.g., Layer 4 of the OSI model), or an application layer (e.g., Layer 7 of the OSI model). The network element can be implemented as a network encryptor configured to encrypt traffic at the network layer (e.g., securing the traffic by establishing an IPsec tunnel for the traffic). The network element can receive this traffic and determine, based on header information and/or payload information of the traffic and/or based on a security configuration of the source and/or the destination, whether the traffic is secured or unsecured. If secured, the network element forgoes its own network layer encryption and sends the traffic forward to the destination. If unsecured, the network element performs its own network layer encryption on the traffic and sends the secured traffic forward to the destination. Furthermore, the network element can store session data about the session between the source and the destination.

The session data can indicate a decision of the network element to perform its network layer encryption or not for a session between the source and the destination. As such, during a next session between the source and the destination, the network element may and implement the decision from the session data on the traffic exchange between the source and the destination during that next session.

In an example, any of the source or the destination can be an endpoint in a network, an online service, a cloud service, etc. The network can be a private network, whereby the private network may be a physical network or a virtual network. In the interest of clarity of explanation, various embodiments are described herein in the context of a virtual network implemented on a cloud infrastructure, such as OCI. An introduction to cloud virtualization is provided first.

A-Introduction to Cloud Virtualization

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed—to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP, Generic Routing Encapsulation (GRE), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant.

In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 12. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 17, 8, 9, and 10 (see references 1716, 816, 916, and 1016) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 8-12 and are described below.

B—Intelligent Network Encryption

Generally, the current approach to network traffic encryption with traditional network protocol suites like IPsec is all-or-nothing. This approach was ideal for networks, where application layer encryption was not widely utilized, and the traffic volume was significantly smaller. However, for modern networks, with large volumes of traffic already utilizing layer 7 encryption, finding a balance between security and efficiency is crucial to optimize network performance. This is due to the fact that encrypting traffic at the network layer is expensive, performance-impacting, and often the cause of bottlenecks in high-volume traffic networks.

Instead of taking the approach of all-or-nothing, embodiments of the present disclosure enable performing intelligent network encryption. The network element(s) responsible for network layer traffic encryption can be configured to perform various operations. One operation includes inspecting the traffic's attributes (e.g., header, payload, application identifier, handshake, the protocol used, etc.) for each session to determine if any network layer, transport layer, or application layer encryption is being utilized by a source or a destination exchanging the traffic. This type of encryption is referred to as endpoint encryption. If a session is determined to utilize any endpoint encryption, then network layer encryption by the network element(s) is not triggered. Further optimization can be achieved by caching the session's attributes and excluding future sessions that match these attributes from utilizing network layer encryption by the network element(s) for a particular amount of time. However, if no endpoint encryption is utilized, then network layer encryption may be implemented.

In an example, the process of inspecting a session and determining if it is already utilizing endpoint encryption uses packets exchanged in the session. As such, the process needs a certain number of packets to flow through the network. In this case, one of many configurable modes can be used to deal with the initial packets. In a first example mode, referred to herein as a guarded mode, security is prioritized over performance. In particular, a session is assumed to be unsecured and, thus, by default is secured using network layer encryption until the assumption is determined to be incorrect. As such, an unknown session (a session for which no session data exists in the cache) can be treated as unsecured and, as such, may be encrypted at the network layer immediately. If the inspection process determines that the session is secured by an endpoint encryption, then the network layer encryption can be withdrawn. In a second example mode, referred to herein as a dispatch mode, performance is prioritized over security. In particular, a session is assumed to be secured using endpoint encryption and, thus, by default is not further secured using network layer encryption until the assumption is determined to be incorrect. As such, an unknown session can be treated as secure, where the network layer encryption is only applied if the inspection process determines that no endpoint encryption is taking place.

FIG. 1 illustrates an example computer environment that enables securing traffic between a source 110 and a destination 150, according to certain embodiments. In the illustrative example, the computer environment includes, among other components, the source 110, a network element 120, and the destination 150. The source 110 can send traffic 112 to the destination 150 in a session between the source 110 and the destination 150. The network element 120 can determine whether the traffic 112 is already secured with endpoint encryption or if unsecured. If already secured, the network element 120 forgoes further securing the traffic 112 with its own network layer encryption and sends the traffic 112 to the destination 150 (shown as secured traffic 122). If unsecured, the network element 120 secures the traffic 112 by performing network layer encryption on the traffic 112, resulting in the secured traffic 122, and sends the secured traffic 122 to the destination 150.

In an example, the source 110 can be an endpoint within a private network of a customer. The private network can be a physical network or a virtual network. The destination 150 may not belong to the private network. Instead, the destination 150 may be in a different private network and/or may be available as online service in a multi-tenant network or even in a public network. As such, the traffic exchange between the source and the destination may be carried over a data network in between, such as the Internet, a local area network, a wide area network, etc. Securing the traffic exchange provides various technical advantages.

The network element 120 can be integrated with the source 110 (e.g., as a software module) or can be separate from the source 110. In case it is separate from the source 110, the network element 120 can be a node along the network path between the source 110 and the destination 150. In an example, the network element 120 can belong to the same private network as the source 110, where the private network is denoted in FIG. 1 with the dashed rectangle. For instance, the network 120 can be a router, a gateway, a data processing unit, etc. (or a software module thereof) that belongs to the private network. In the case of a virtual private network, such as a VCN, the network element 120 can be virtualized by an NVD (e.g., a smart-NIC).

The network element 120 can include or have access to memory cache 130. In the memory cache 130, the network element 120 can store session data about a session between the source 110 and the destination. The session data can have a set of session attributes (e.g., IP address(es), port number(s), endpoint identifier(s), application identifier(s), etc.). Such attributes can also include a time attribute (e.g., a time to live (TTL) attribute) indicating a duration during which the session data is applicable. Generally, the session data can be used for an optimization by indicating whether traffic exchange between the source 110 and the destination 150 is already secured using endpoint encryption or needs to be secured using network layer encryption. In an example, and as further described herein below, based on some initial network traffic and/or a security configuration of the source 110 and/or the destination 150, the network element 120 can generate a decision about whether the network layer encryption by the network element 120 is to be used or not. The session data can indicate such a decision by storing the relevant data (e.g., a flag set to a value to indicate a positive decision to use the network layer encryption or another value to indicate a negative decision not to use the network layer encryption). Subsequently, as part of a session being established between the source 110 and the destination, and as long as this session is being established prior to the expiration of the time attribute, the network element 120 can determine and implement the decision from the session data.

In an example, a new session is being established between the source 110 and the destination 150. The new session has a set of session attributes (e.g., IP address(es), port number(s), endpoint identifier(s), application identifier(s), etc.). The network element 120 determines whether a match exists between this set of attributes and the session data. If so (including that this new session is before the TTL attribute expiration), the network element 120 determines that this new session is a known session and implements the decision stored in the memory cache 130. If the decision is to secure the traffic 112 in the new session, the network element 120 encrypts the traffic 112 at the network layer. An example of this network layer encryption includes encrypting a packet of the traffic 112 and encapsulating the encrypted packet in a layer 3 encapsulation. Otherwise, the network element 120 forgoes encrypting the traffic 112 at the network layer.

If no match exists, the network element 120 can determine that the new session is unknown and, accordingly, the decision is to be generated anew. This can also be the case when no session data exists in the memory cache 130 or when such session data has expired.

Different techniques (and a combination thereof) can be used to generate the decision anew. In one example technique, the traffic itself is inspected. In another technique, the security configuration of the source 110 and/or the destination 150 is used.

In a packet inspection technique example, the network element 120 can process a number of initial packets included in the traffic 112. The processing can involve determining if a layer 3 encryption is already in use (e.g., by looking at header information indicating the use of an encapsulating security payload (ESP)), a layer 4 encryption is already in use (e.g., by looking up a port number via which the traffic 112 is sent and determining if the port number is associated with a protocol that uses encryption), or a layer 7 encryption is already in use (e.g., by determining from the header information whether a protocol is used for application encryption, such as by observing a transport layer (TLS) handshake). If so, the network element 120 determines that endpoint encryption is already in use and, thus, the traffic 112 is already secured. The decision is then to forgo performing network layer encryption by the network element 120 on the traffic 112. Otherwise, the traffic 112 is not already secured and the decision is to perform network layer encryption by the network element 120 on the traffic 112. In both cases, the decision can be cached in session data.

Additionally, or alternatively to inspecting header information of a packet, payload information can be inspected. For example, if the content of the payload of a packet is already encrypted, this packet is determined to be already secured and the decision is to forgo performing network layer encryption by the network element 120 on the traffic 112. Otherwise, the packet is unsecured, and the decision is to perform network layer encryption by the network element 120 on the traffic 112. The network element 120 can process the payload's content to determine if it includes clear text or ciphered text. The determination that the packet is already encrypted corresponds to the network element 120 determining that the content included ciphered text.

As explained, the initial packets are processed to generate the decision. The decision is implemented on the subsequent packets of the traffic 112. As such, the question arises about whether initial packets need to be secured or not. Different modes can be used to answer the question. In a guarded mode, the session is assumed to be unsecured. By default, the network element 120 secures the initial packets by performing network layer encryption on them. If the subsequent decision is to forgo the network layer encryption, the subsequent packets are not secured by the network element 120. Otherwise, the network element 120 also applies the network layer application to the subsequent packets. The guarded mode prioritizes security over performance.

In a dispatch mode, an opposite approach is used where the performance is prioritized. In the dispatch mode, the session is assumed to be secured. By default, the network element 120 does not secure the initial packets by forgoing performing network layer encryption on them. If the subsequent decision is to secure the traffic, the subsequent packets are secured by the network element 120. Otherwise, the network element 120 continues forgoing the application of the network layer application to the subsequent packets.

In a security configuration technique example, the network element 120 can have access (e.g., as data stored in the memory cache 130) to configuration data about the source 110 and/or the destination 150. The configuration data can indicate whether an endpoint (e.g., the source 110 or the destination 150) secures its traffic or only receives already secured traffic, where such traffic is secured at any of the network layer, the transport layer, or the application layer. In this example, while a new session is being established between the source 110 and the destination 150, the network element 120 can look up the configuration data and determine whether the traffic 112 is expected to be secured or not. If expected to be secured, the network element 120 can generate the decision to forgo performing its own network layer encryption on the traffic 112 of the new session. Otherwise, the network element 120 can generate the decision to perform its own network layer encryption on the traffic 112 of the new session.

In an example, the network element 120 can be configured, via the user input, to use any or a combination of the above techniques and/or to cache session data. Additionally, or alternatively, the network element 120 can be configured to stop the flow of the traffic 112 unless the traffic 112 can be secured. For example, if the destination 150 does not support the network layer encryption of the network element 120 (e.g., the destination can not use an IPsec tunnel), the network element 120 can be configured to stop the egress flow of the traffic to the destination 150 and/or the ingress flow of traffic to the source 110.

Figure 2:
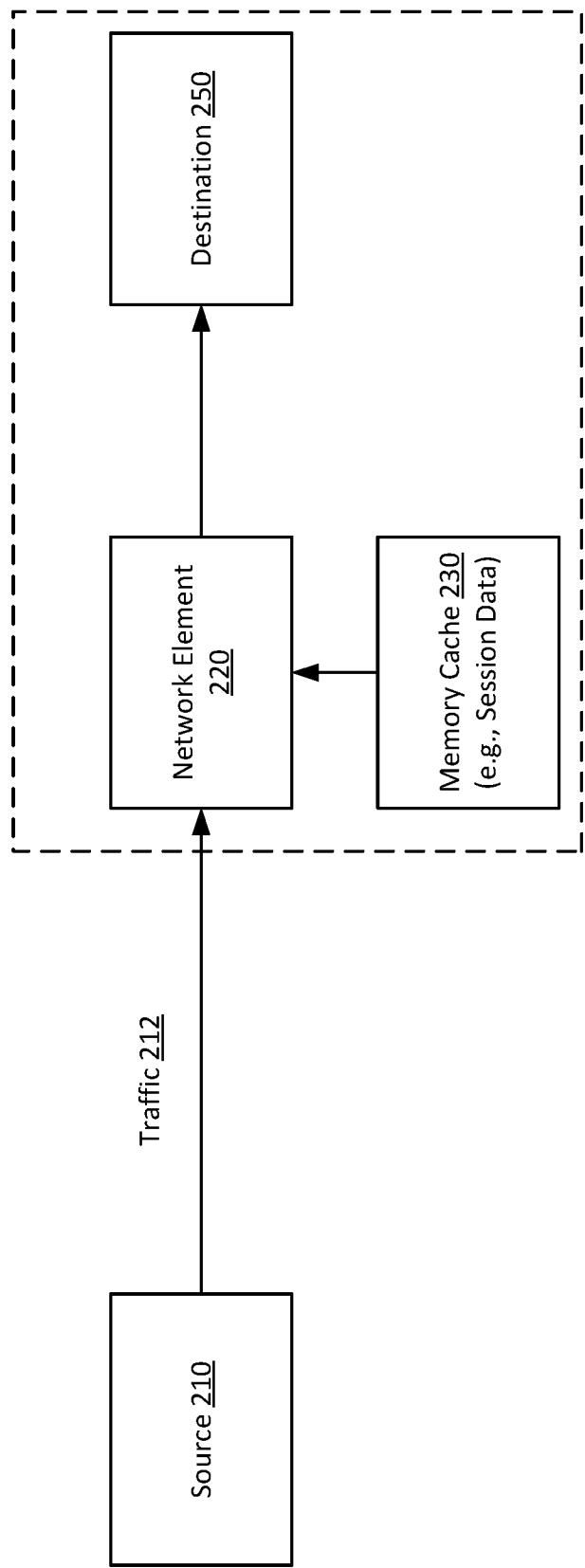
FIG. 2 illustrates another example computer environment that enables securing traffic between a source and a destination, according to certain embodiments.

FIG. 2 illustrates another example computer environment that enables securing traffic between a source and a destination, according to certain embodiments. In the illustrative example, the computer environment includes, among other components, the source 210, a network element 220, a memory cache 230, and the destination 250. The source 210 can send traffic 212 to the destination 250 in a session between the source 210 and the destination 250. The network element 220 can be implemented to enable the traffic exchange to be secured.

In an example, the source 210 and the destination 250 can be similar to the source 110 and the destination 150, respectively, of FIG. 1. Similarities are not repeated herein in the interest of brevity but equally or equivalently apply to FIG. 2. Rather than being included in the source 210 or being a node in the same private network of the source 210, the network element is included in or is a node in the same private network of the destination 250, as illustrated with the dashed rectangle in FIG. 2. Similar to the memory cache 130 of FIG. 1, the memory cache 230 can store session data and can be accessible to the network element 220.

In FIG. 1, the network element 120 enables securing the traffic exchange on behalf of the source 110 (e.g., by establishing an IPSec tunnel with the destination 150). As such, the traffic 112 sent by the source 110 can be, as needed, secured using network layer encryption performed thereon by the network element 120. Conversely, the traffic sent by the destination 150 to the source 110 can be already secured by the destination 150 (e.g., given the IPSec tunnel in place).

In comparison, the network element 220 of FIG. 2 enables securing the traffic exchange on behalf of the destination 250 (e.g., by establishing an IPSec tunnel with the source 210). As such, the traffic 212 sent by the source 210 to the destination 250 can be already secured by the source 210 (e.g., given the IPSec tunnel in place). Conversely, the traffic sent by the destination 250 to the source 210 can be, as needed, secured using network layer encryption performed thereon by the network element 220. In an example, if the traffic 212 sent to the destination 250 is not secured, the network element 220 can be configured to stop the traffic 212 from reaching the destination 250.

Figure 3:
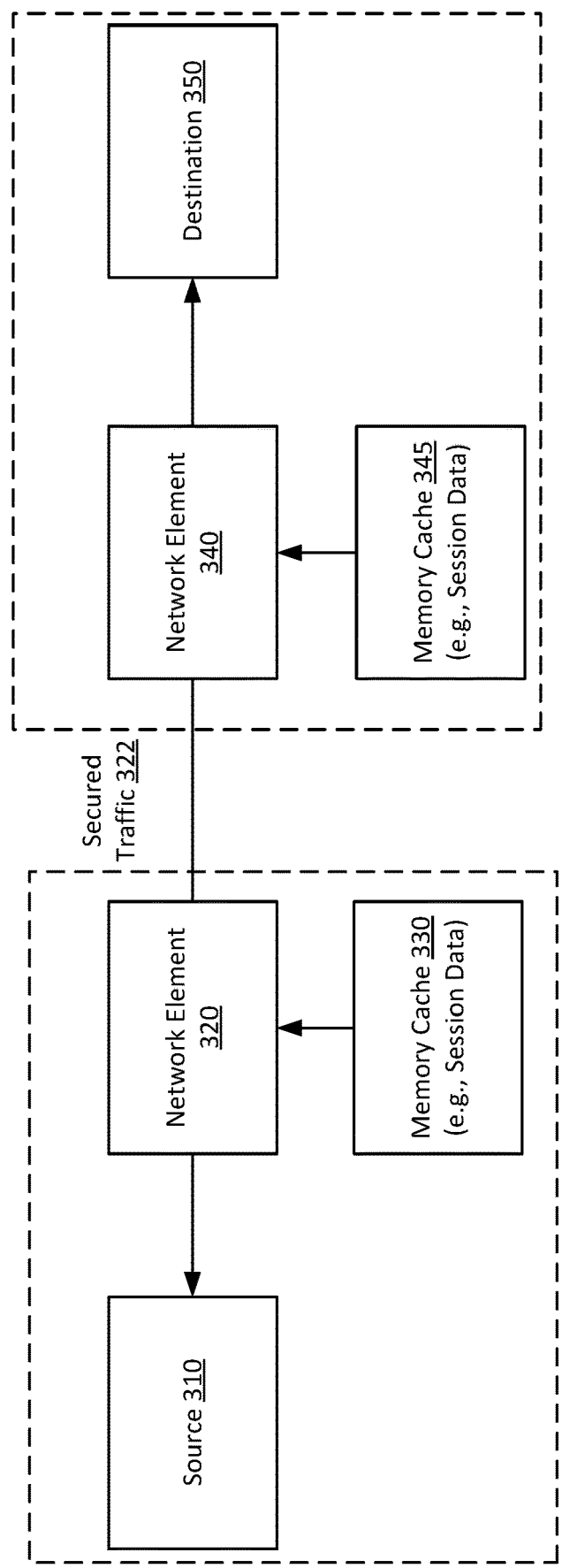
FIG. 3 illustrates yet another example computer environment that enables securing traffic between a source and a destination, according to certain embodiments.

FIG. 3 illustrates yet another example computer environment that enables securing traffic between a source 310 and a destination 350, according to certain embodiments. In the illustrative example, the computer environment includes, among other components, the source 310, a network element 320, a memory cache 330, a network element 340, a memory cache 345, and the destination 350. The source 310 and the destination 350 can exchange traffic. The network element 320 can enable, as needed, securing at the network layer traffic sent by the source 310 to the destination 350 and, possibly, stopping any unsecured traffic sent from destination 350 to the source 310. Similarly, the network element 340 can enable, as needed, securing at the network layer traffic sent by the destination 350 to the source 310 and, possibly, stopping any unsecured traffic sent from the source 310 to the destination. As such, traffic exchanged between the source 310 and the destination 350 is secured traffic 322 (where this traffic is secured at any of the network layer, transport layer, or application layer by the sending endpoint or, otherwise, is secured at the network layer by the relevant network element).

In a way, the computing environment of FIG. 3 illustrates a combination of the computer environments of FIG. 1 and FIG. 2. Particularly, the source 310, the network element 320, and the memory cache 330 are similar to the source 110, the network element 120, and the memory cache 130, respectively, of FIG. 1. The network element 340, the memory cache 345, and the destination 350 are similar to the network element 220, the memory cache 230, and the destination 250, respectively, of FIG. 2. Similarities are not repeated herein in the interest of brevity but equally or equivalently apply to FIG. 3.

In the illustrative example of FIG. 3, the network element 320 and the network element 340 secure, as needed, the traffic exchange between the source 310 and the destination 350 by establishing an IPsec tunnel between the network element 320 and the network element 340. As such, the traffic between these two network elements 330 and 340 is encrypted at the network layer. The IPSec tunnel may not be used if the traffic is secured in the first place (e.g., by the source 310 and/or the destination 350) at the network layer (e.g., an IPSec tunnel exists between the source 310 and the destination 350), at the transport layer (e.g., the source 310 and the destination are using ports associated with encrypted traffic), or the application layer (e.g., an application at the source 310 and an application 320 at the destination are encrypting the traffic).

In an example, while a session is being established between the source 310 and the destination 350, a network element (e.g., either the network element 320 or the network element 340, or possibly both network elements 320 and 340 working with each other) can generate a decision to secure the session at the network layer or to forgo such securing. Similar to the above description, the decision for a known session can be made from session data stored in a memory cache (e.g., the memory cache 330 in the case of the memory element 320, and the memory cache 340 in the case of the network element 340) or can be made anew (e.g., for an unknown session, if the session data has expired, or in case of a decision conflict or mismatch between the session data of the network element 320 and the session data of the network element 340). A traffic inspection technique and/or a security configuration technique can be implemented to make the decision anew. In the case of the traffic inspection technique, a guarded mode or a dispatch mode can be followed with regard to processing initial packets and using a IPSec tunnel between the network element 320 and the network element 340 thereafter.

Figure 4:
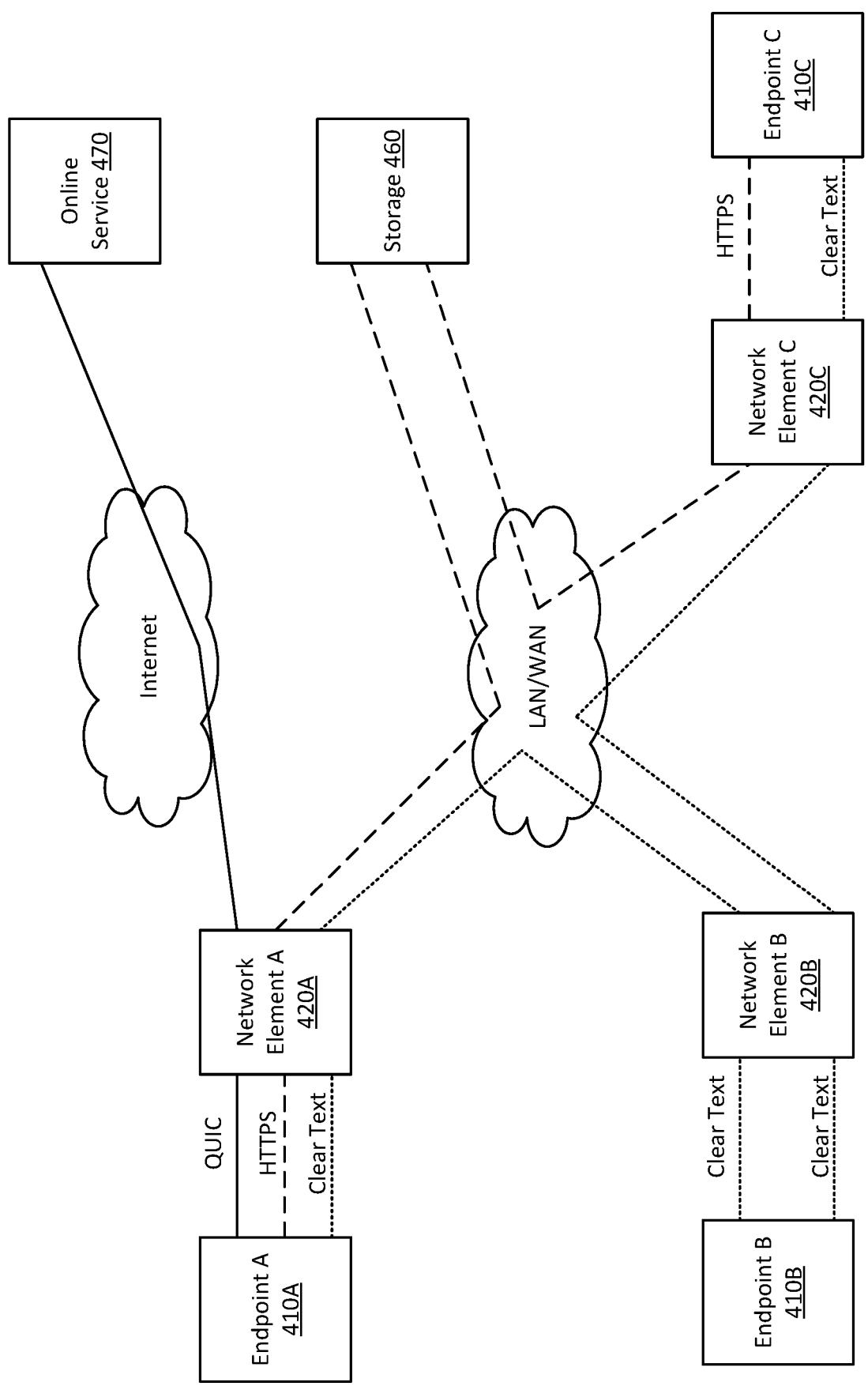
FIG. 4 illustrates an example of traffic flows between computing nodes, where at least some of the traffic flows are secured, according to certain embodiments.

FIG. 4 illustrates an example of traffic flows between computing nodes, where at least some of the traffic flows are secured, according to certain embodiments. Here, particular nodes and traffic exchanges are described for illustrative purposes only. The embodiments of the present disclosure are not limited as such.

As illustrated, a first endpoint A 410A, a second endpoint B 410B, and a third endpoint C 410C exchange traffic with each other. These endpoints are associated with a same customer and can be hosted in different private networks of the customer, where such networks are interconnected via a local area network and/or a wide area network.

As further illustrated, each of the endpoint A 410A and the endpoint C 410C accesses, over the local area network and/or the wide area network, a storage 460. The storage 460 can be a cloud based storage supported by a multi-tenancy service, such as the OCI object storage.

Additionally, the endpoint A 410A can access an online service 470 over the Internet. For example, the online service 470 can be a document service provided by a third party (e.g., Google Docs, available from Google, CA USA).

To secure traffic exchanges, different network elements are implemented. For example, a first network element A 420A is implemented in association with the first endpoint A 410A. Similarly, a second network element B 420B is deployed in association with the second endpoint B 410B. And a third network element C 420C is deployed in association with the third endpoint C 410C.

Referring to the first endpoint A 410A and the online service 470, an unknown session is established between the two. As part of establishing that session, the first network element A 420A uses a traffic inspection technique by parsing initial packets exchanged between the first endpoint A 410A and the online service 470. This packet inspection indicates that the QUIC protocol applies to the traffic in the session. The QUIC protocol encrypts traffic at the application layer. As a result, the first network element A 420A determines that the traffic in the new session will already be secured at the application layer. Accordingly, the first network element A 420A generates a decision to forgo performing network layer encryption on the traffic (e.g., to forgo establishing an IPSec tunnel to the online service 470). This decision can be cached and, possibly, re-used during a next session.

Referring to the first endpoint A 410A and the storage 460, an unknown session is established between the two. As part of establishing that session, the first network element A 420A uses a traffic inspection technique by parsing initial packets exchanged between the first endpoint A 410A and the storage 460 to establish the session. This packet inspection indicates that the HTTPS protocol will be used for the traffic in the session. The HTTPS protocol encrypts traffic at the application layer (e.g., based on a TLS handshake). As a result, the first network element A 420A determines that the traffic in the new session will already be secured at the application layer. Accordingly, the first network element A 420A generates a decision to forgo performing network layer encryption on the traffic (e.g., to forgo establishing an IPSec tunnel to the storage 460). This decision can be cached and, possibly, re-used during a next session. A similar decision is made by the third network element C 420C for a session between the third endpoint C 410C and the storage 460.

Referring to the first endpoint A 410A and its communications with the second endpoint B 410B, an unknown session is established between the two. As part of establishing that session, the first network element A 420A uses a traffic inspection technique by parsing initial packets exchanged between the first endpoint A 410A and the second endpoint B 410B to establish the session. This packet inspection indicates that the traffic in the session will not be secured by the two endpoints 410A and 410B. As a result, the first network element A 420A generates a decision to perform network layer encryption on the traffic (e.g., by establishing an IPSec tunnel with the second network element B 420B). This decision can be cached and, possibly, re-used during a next session. A similar decision is made by the first network element A for a session between the first endpoint A 410A and the third endpoint C 410C.

In a variation, instead of or in conjunction with the first network element A 420A, the second network element B 420B may generate the decision for the session between the first endpoint A 410A and the second endpoint B 410B. Similarly, the third network element C 420C may generate the decision for the session between the first endpoint A 410A and the third endpoint C 410C.

Referring to the second endpoint B 410B and its communications with the third endpoint C 410C, an unknown session is established between the two. As part of establishing that session, the second network element B 420B uses a traffic inspection technique by parsing initial packets exchanged between the second endpoint B 410B and the third endpoint C 410C to establish the session. This packet inspection indicates that the traffic in the session will not be secured by the two endpoints 410B and 410C. As a result, the second network element B 420B generates a decision to perform network layer encryption on the traffic (e.g., by establishing an IPSec tunnel with the third network element C 420C). This decision can be cached and, possibly, re-used during a next session. In a variation, instead of or in conjunction with the second network element B 420B, the third network element C 420C may generate the decision for the session between the second endpoint B 410B and the third endpoint C 410C.

Figure 5:
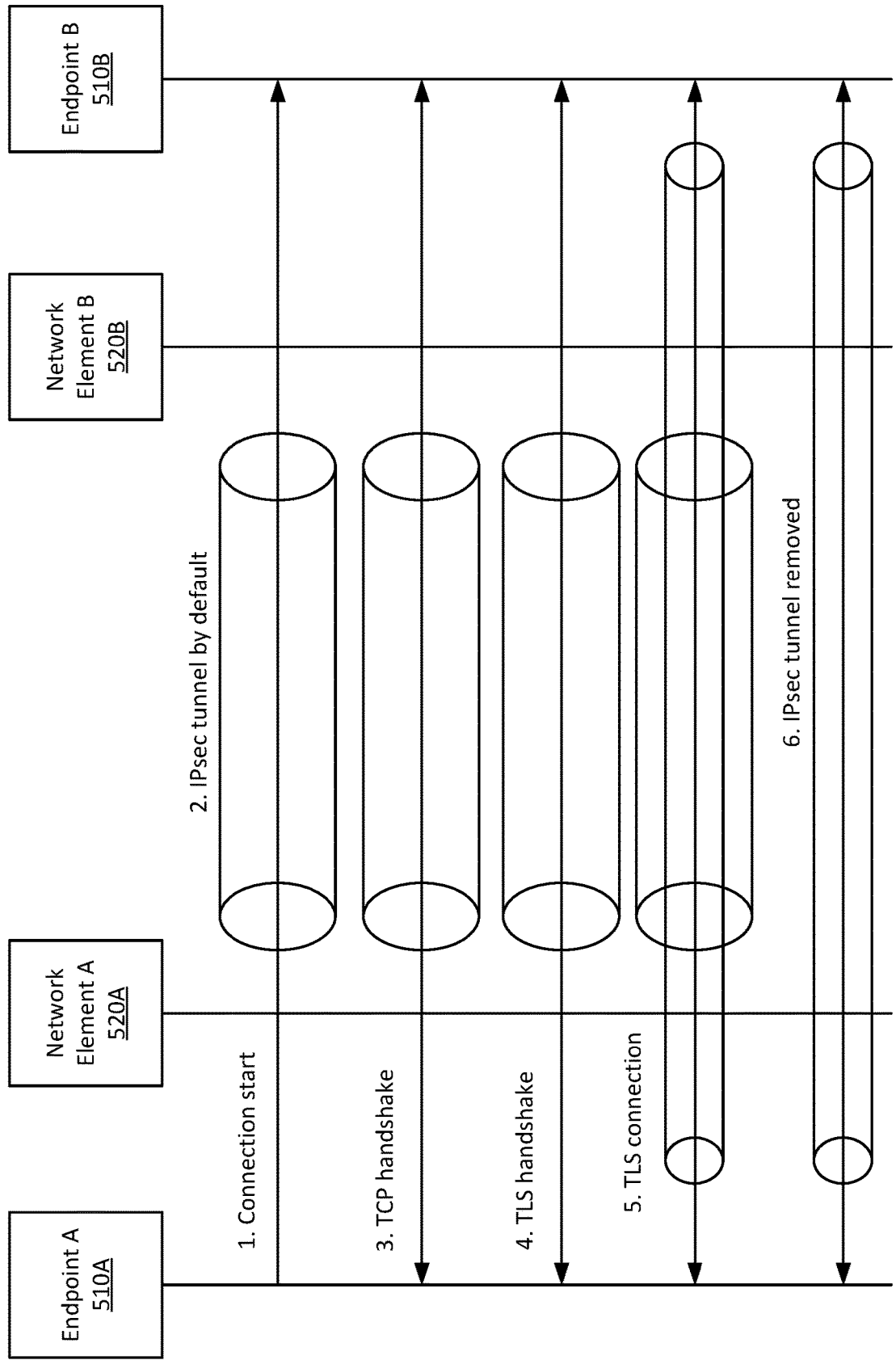
FIG. 5 illustrates an example sequence diagram for securing traffic between a source and a destination, according to certain embodiments.

FIG. 5 illustrates an example sequence diagram for securing traffic between a source and a destination, according to certain embodiments. Here, a guarded mode is described. In the illustrative example of FIG. 5, a first endpoint A 510 A establishes a session with a second endpoint B 510B. A first network element A 520A is associated with the first endpoint A 510A (e.g., by being a component of the first endpoint A 510A or by belonging to the same private network of the first endpoint A 510A). The first network element 510A is deployed to enable, as needed, securing the traffic in the session at the network layer. A second network element B 520B may also be associated with the second endpoint B 510B and, optionally deployed. If the second network element B 520B is not deployed, the first network element 510A can secure the traffic by establishing an IPSec tunnel with the second endpoint B 510B. If the second network element B 520B is deployed, the first network element 510A can secure the traffic by establishing an IPSec tunnel with the second network element 520B. The endpoints 510A and 510B and the network elements 520A and 520B are examples of the endpoints and network elements described in FIG. 4.

In the interest of clarity of explanation, FIG. 5 illustrates that the second network element B 520B is deployed. Further, particular protocols related to Transmission Control Protocol (TCP) and Hypertext Transfer Protocol Secure (HTTPS) are described. However, the embodiments are not limited as such. For example, the second network element B 520B need not be deployed or used. Furthermore, rather than the securing being performed by the first network element A 520A, it may be performed by the second network element B 520B. Other protocols are also possible to use.

In a first step of the diagram, the first endpoint A 510A begins the connection request with a TCP SYN to the second endpoint B 510B. In a second step of the diagram, the first network element A 520A determines that an unknown session is being established. For instance, the first network A 520A uses one or more attributes of the session being established to look up cached session data. The result of the look up is a cache miss, indicating that this session has not been seen before. Thus, the first network element A 520A assumes that the connection is unsecured and builds an IPsec tunnel to the second network element B 520B.

In a third step of the diagram, the second endpoint B 510B and the first endpoint A 510A complete the TCP three-way handshake over the IPsec tunnel. In a fourth step of the diagram, the second endpoint B 510B and the first endpoint A 510A stard or complete a TLS handshake over the IPsec tunnel. In a fifth step of the diagram, a TLS connection is established between the first endpoint A 510A and the second endpoint B 510B over the IPsec tunnel. In a sixth step of the diagram, the first network element A 520A determines that this connection is secured at the application layer by observing the use of the TLS protocol in the packet exchange related to the TLS handshake. Accordingly, the first network element A 520A tears down the IPsec tunnel. From that point on, the second endpoint B 510B and the first endpoint A 510A continue to communicate securely over TLS.

Figure 6:
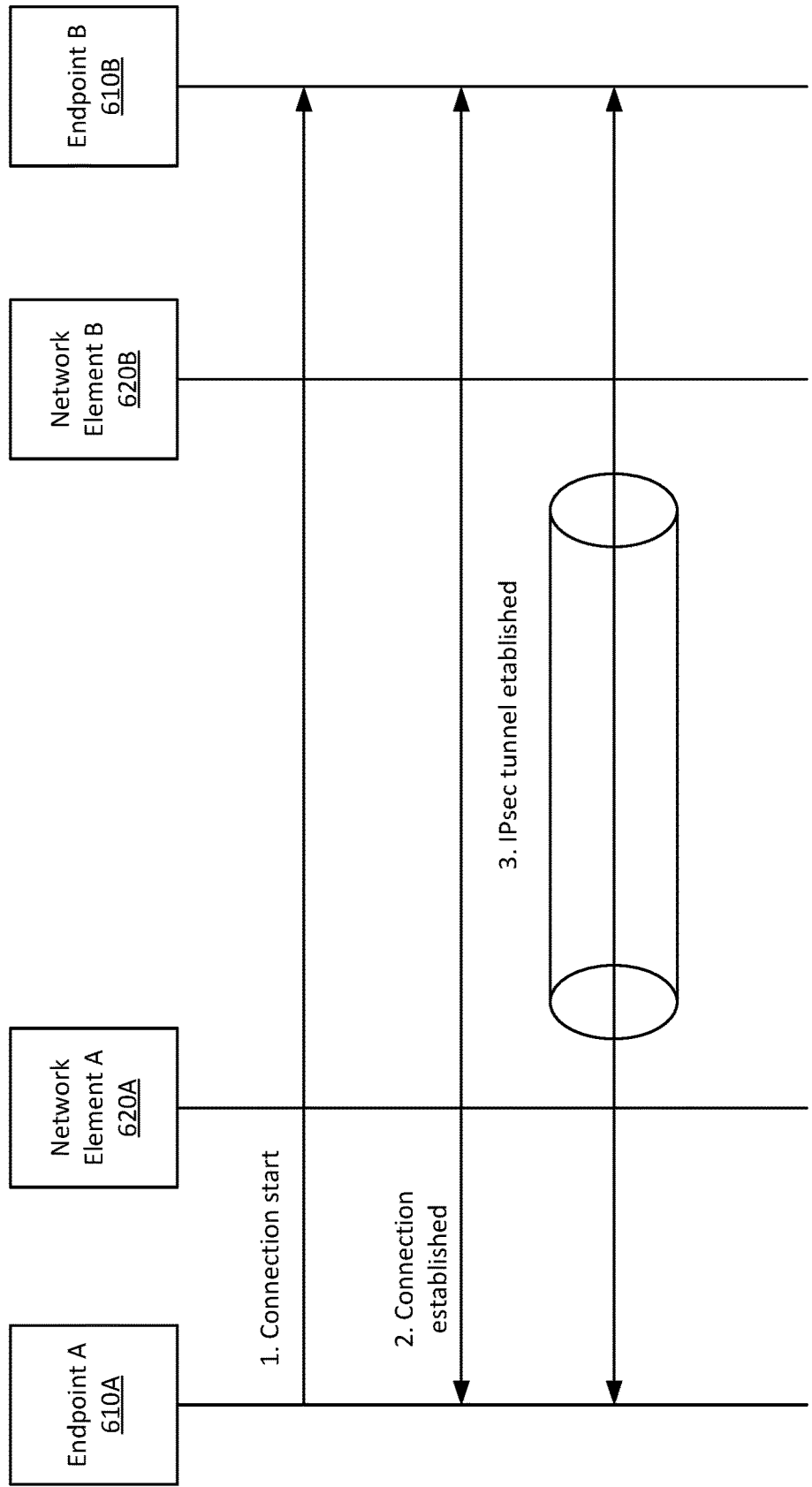
FIG. 6 illustrates another example sequence diagram for securing traffic between a source and a destination, according to certain embodiments.

FIG. 6 illustrates another example sequence diagram for securing traffic between a source and a destination, according to certain embodiments. Here, a dispatch mode is described. In the illustrative example of FIG. 6, a first endpoint A 610 A establishes a session with a second endpoint B 610B. A first network element A 620A is associated with the first endpoint A 610A (e.g., by being a component of the first endpoint A 610A or by belonging to the same private network of the first endpoint A 610A). The first network element 610A is deployed to enable, as needed, securing the traffic in the session at the network layer. A second network element B 620B may also be associated with the second endpoint B 610B and, optionally deployed. If the second network element B 620B is not deployed, the first network element 610A can secure the traffic by establishing an IPSec tunnel with the second endpoint B 610B. If the second network element B 620B is deployed, the first network element 610A can secure the traffic by establishing an IPSec tunnel with the second network element 620B. The endpoints 610A and 610B and the network elements 620A and 620B are examples of the endpoints and network elements described in FIG. 4.

In the interest of clarity of explanation, FIG. 6 illustrates that the second network element B 620B is deployed. Further, particular protocols related to Transmission Control Protocol (TCP) and Hypertext Transfer Protocol (HTTP) are described. However, the embodiments are not limited as such. For example, the second network element B 620B need not be deployed or used. Furthermore, rather than the securing being performed by the first network element A 620A, it may be performed by the second network element B 620B. Other protocols are also possible to use.

In a first step of the diagram, the first endpoint A 610A begins the connection request with a TCP SYN to the second endpoint B 610B. In a second step of the diagram, an HTTP connection is established. For example, a TCP ACK is sent from the second endpoint B 610B to the first endpoint A 610A, followed by an ACK back from the first endpoint A 610A.

In a third step of the diagram, the first network element A 620A determines that this connection is unsecured by observing that no TLS handshake was performed. Accordingly, the first network element A 620A generates a decision to secure the traffic at the network layer and implements this decision by establishing an IPsec tunnel with the second network element B 620B. From that point on, the second endpoint B 610B and the first endpoint A 610A continue to communicate securely over the IPSec tunnel.

Figure 7:
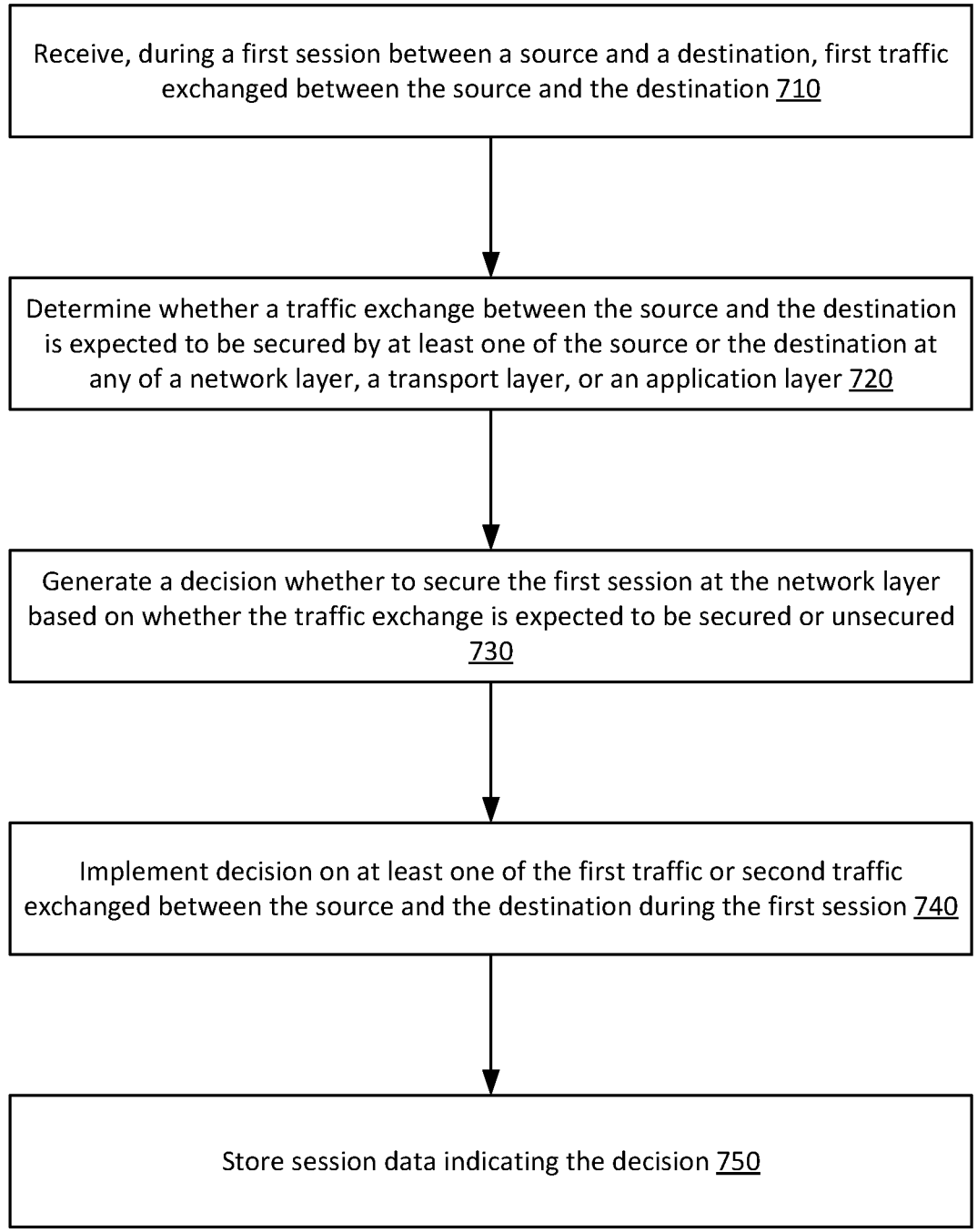
FIG. 7 illustrates an example flow for securing traffic between a source and a destination, according to some embodiments.

FIG. 7 illustrates an example flow for securing traffic between a source and a destination, according to some embodiments. Operations of the flows can be performed by a computer system that implements a network element, such as any of the network elements described herein above. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes at step 710, the computer system receiving, during a first session between a source and a destination, first traffic exchanged between the source and the destination. For example, the first traffic includes ones or more packets sent from the source to the destination and/or the destination to the source, where such packets exchange information between the source and the destination to establish the first session. Here, the first traffic can be received by the network element.

In an example, the flow includes at step 720, the computer system determining whether a traffic exchange between the source and the destination is expected to be secured by at least one of the source or the destination at any of a network layer, a transport layer, or an application layer. For example, the network element implements a traffic inspection technique to parse header and/or payload information to determine positively that the source and/or the destination have already secured the one or more packets and/or will secure subsequent packets at any or a combination of the network layer, the transport layer, or the application layer or negatively that no such securing is used or will be used. Additionally, or alternatively, the network element looks up configuration data of the source and/or the destination, where such configuration data indicates positively that the source and/or the destination are configured by default to secure the one or more packets and/or the subsequent packets at any or a combination of the network layer, the transport layer, or the application layer or negatively that no such securing is used or will be used. Additionally, or alternatively, the network element looks uses one or more session attributes of the session to look up a memory cache that may store session data indicating positively that the source and/or the destination are configured to secure the one or more packets and/or the subsequent packets at any or a combination of the network layer, the transport layer, or the application layer or negatively that no such securing is used or will be used.

In an example, the flow includes at step 730, the computer system generating a decision whether to secure the first session at the network layer based on whether the traffic exchange is expected to be secured or unsecured. When a positive determination is made at step 720, the network element generates a decision to forgo securing the first session (e.g., by forgoing implementing network layer encryption on the first traffic or subsequent traffic). When a negative determination is made at step 720, the network element generates a decision to secure the first session (e.g., by implementing the network layer encryption on the first traffic or subsequent traffic).

In an example, the flow includes at step 740, the computer system implementing the decision on at least one of the first traffic or second traffic exchanged between the source and the destination during the first session. For example, the first traffic can include additional packets that may still be part of establishing the session. The second traffic can include packets exchanged subsequent to establishing the session (e.g., data packets). Accordingly, if the decision is to forgo securing the first session, the network element does not perform network layer encryption on the second traffic. In the case of a guarded mode, the first traffic may have already been secured by the network element. In this case, the network element may remove any established IPSec tunnel. In the case of a dispatch mode, the first traffic may not have already been secured by the network element and no IPSec tunnel needs to be removed. In comparison, if the decision is to secure the first session, the network element performs network layer encryption on the second traffic. In the case of a guarded mode, the first traffic may have already been secured by the network element. In this case, the network element may not remove any established IPSec tunnel. In the case of a dispatch mode, the first traffic may not have already been secured by the network element, bit the IPSec tunnel may be established for the second traffic.

In an example, the flow includes at step 740, the computer system storing session data indicating the decision. For example, the session data can be stored in the memory cache and can be associated with a set of session attributes of the first session. When a second session is to be established between the source and the destination, the network element can look up the session data to determine and implement the cached decision (assuming that the cached session data has not expired yet).

C—Example Infrastructure

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
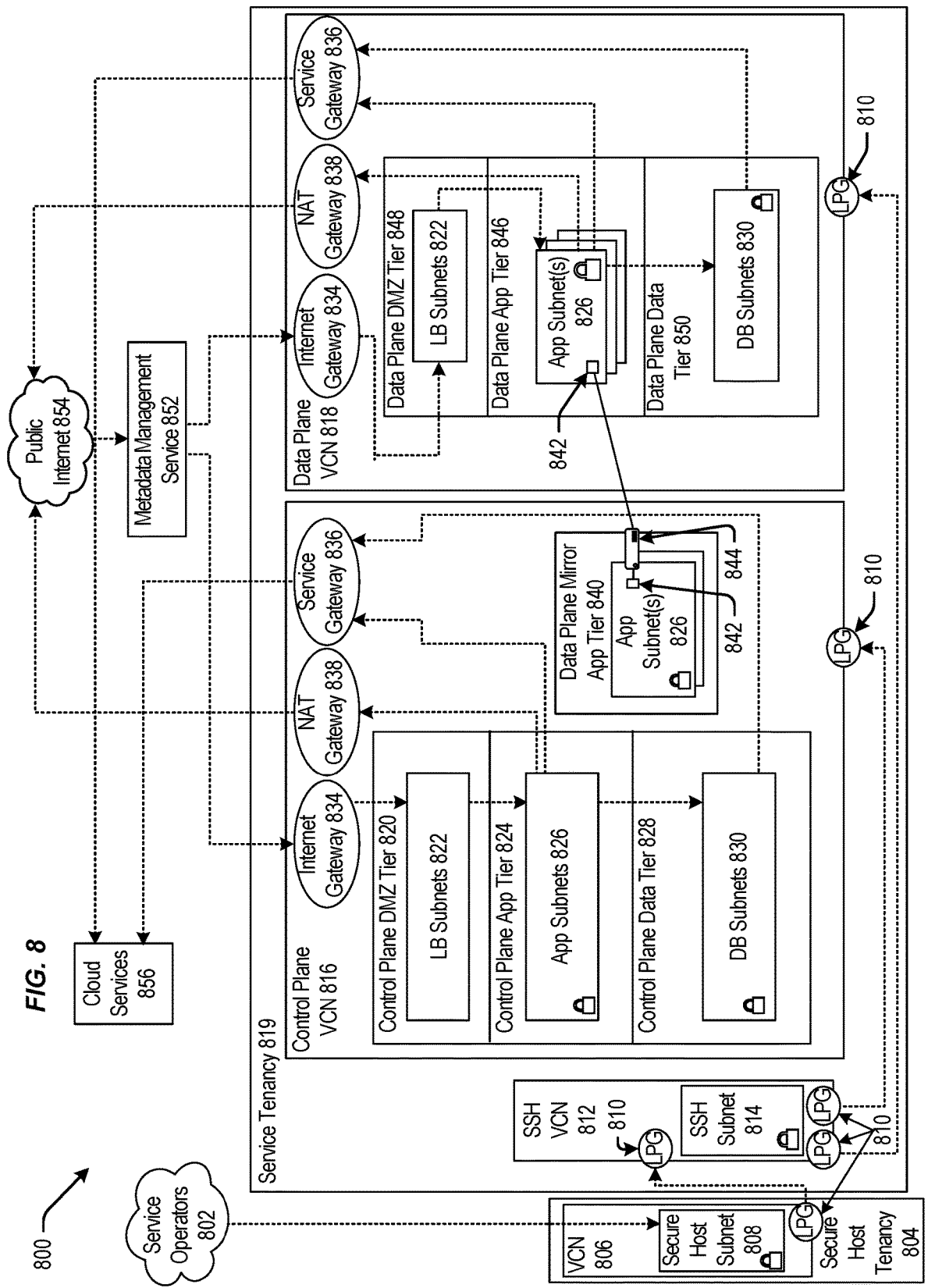
FIG. 8 is a block diagram illustrating one pattern for implementing a cloud infrastructure as a service system, according to certain embodiments.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and be Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. However, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
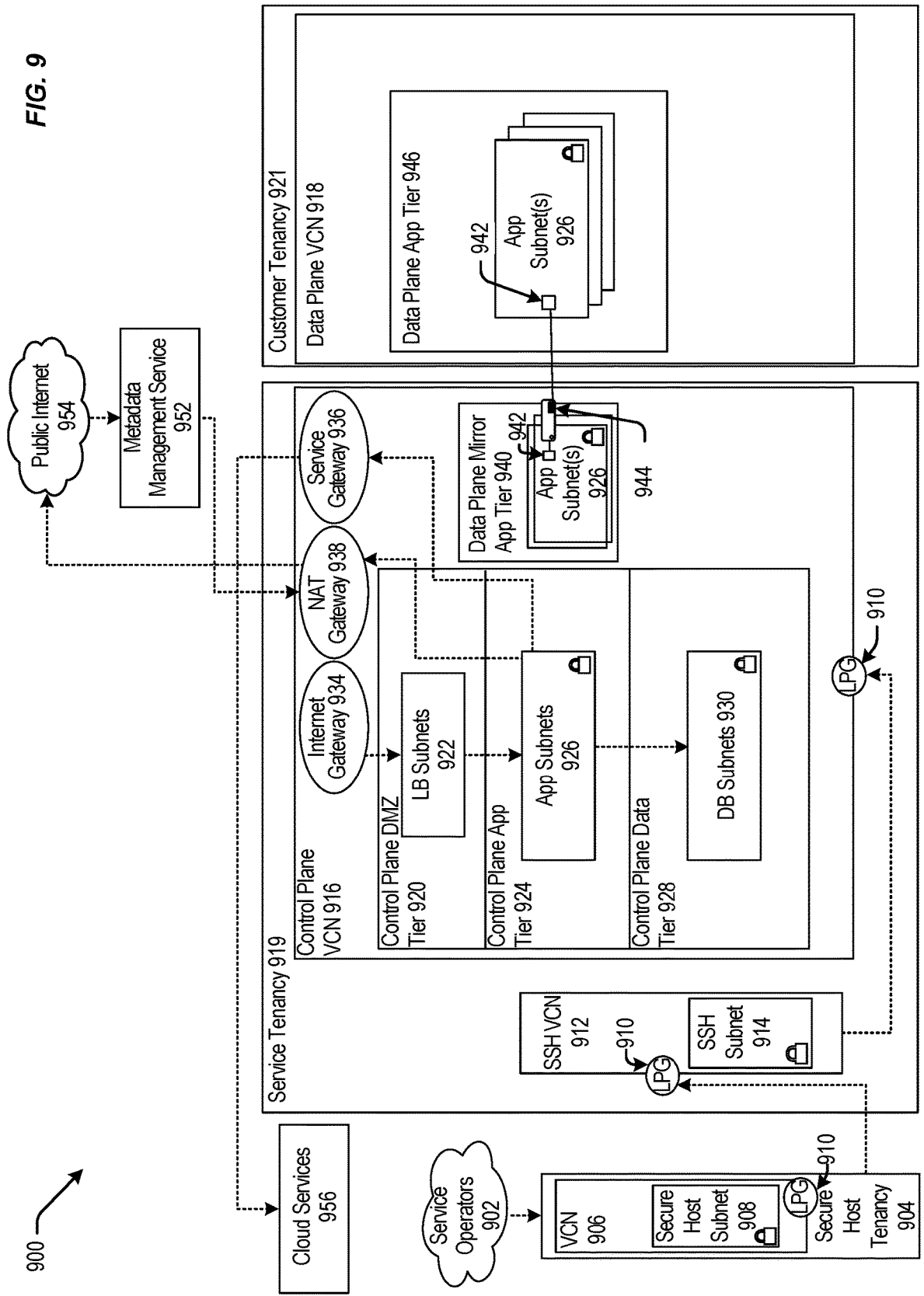
FIG. 9 is a block diagram illustrating another pattern for implementing a cloud infrastructure as a service system, according to certain embodiments.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8" may be located in Region 1 and in Region 2. If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
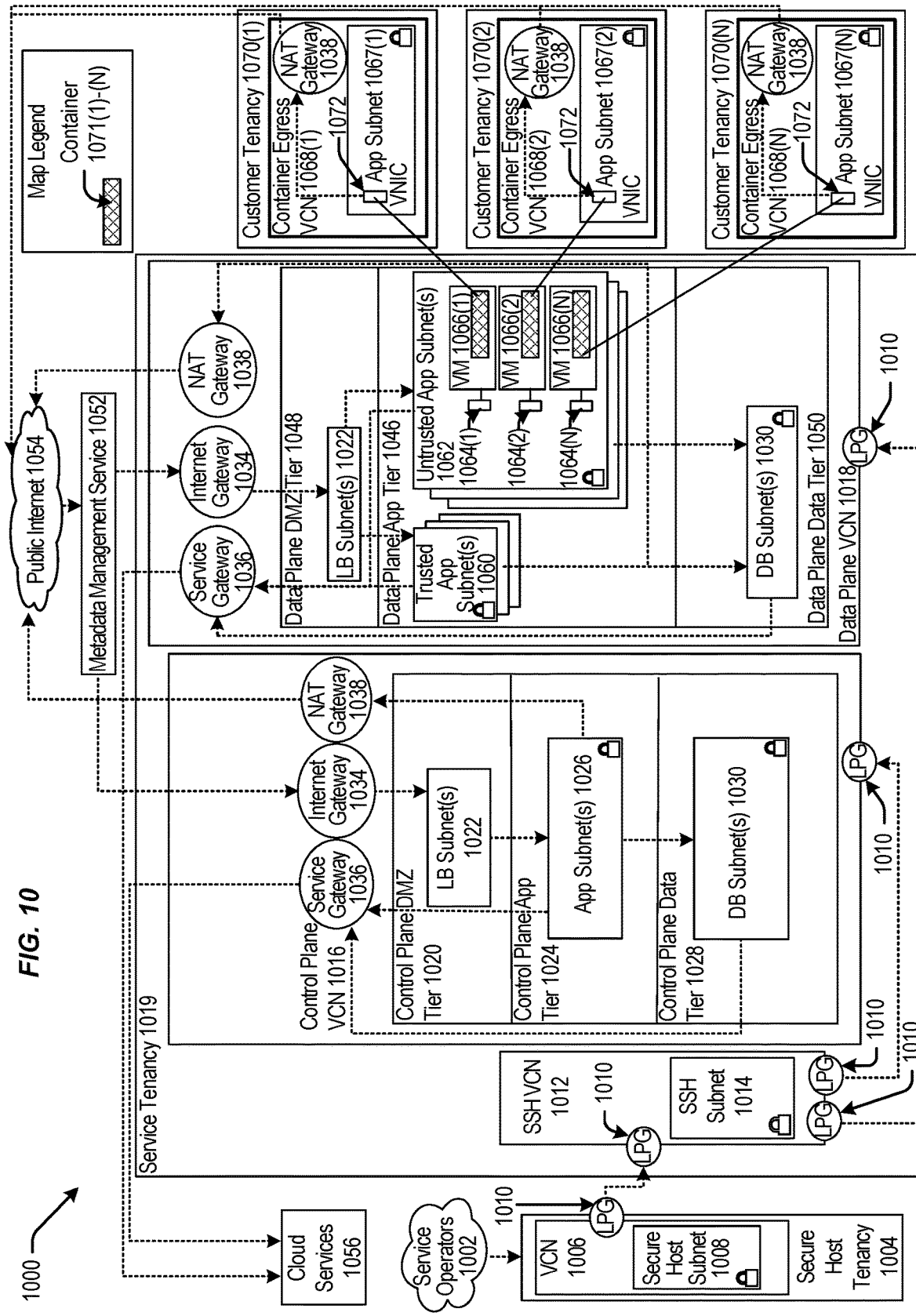
FIG. 10 is a block diagram illustrating another pattern for implementing a cloud infrastructure as a service system, according to certain embodiments.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), and a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case in which support may be desired when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VMs 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
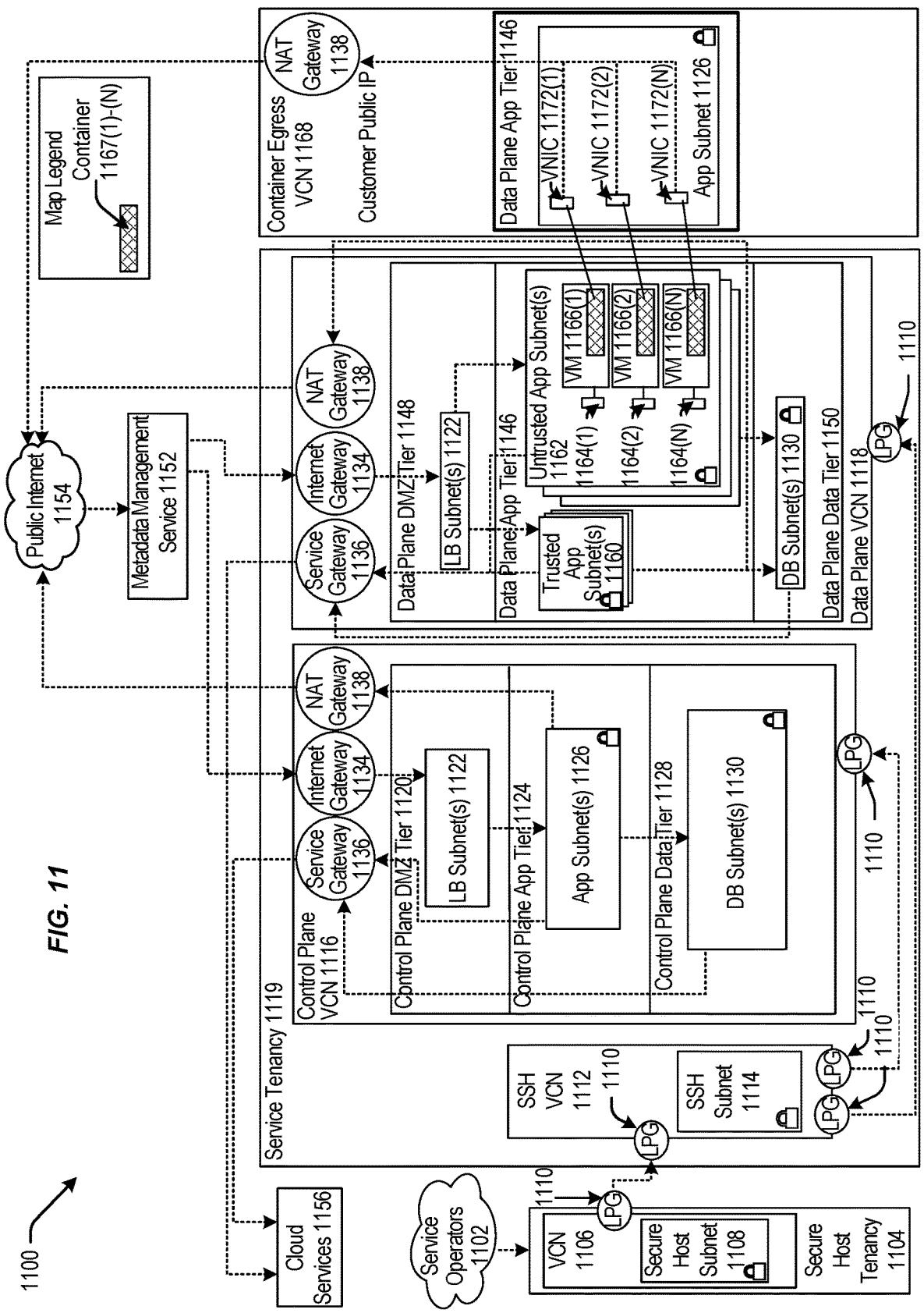
FIG. 11 is a block diagram illustrating another pattern for implementing a cloud infrastructure as a service system, according to certain embodiments.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
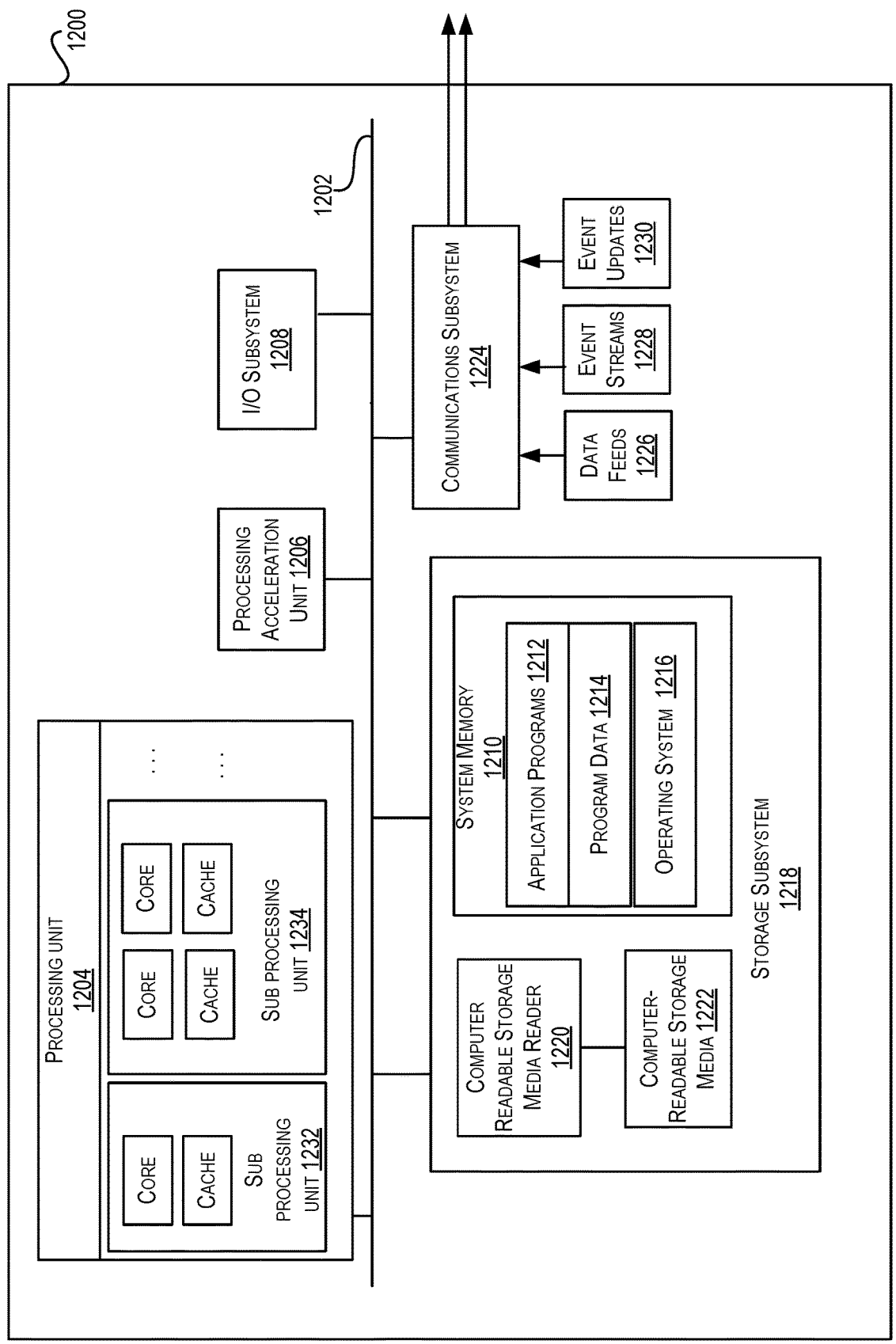
FIG. 12 is a block diagram illustrating an example computer system, according to certain embodiments.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, or medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that, when executed by a processor, provides the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The words "example" and "exemplary" are used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. 5

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope 10 of the specification. The specification and drawings are, accordingly, to be regarded as illustrative rather than restrictive.

What is claimed is:

1. A method implemented by a network element, the method comprising:
    encrypting first traffic in a first session between a source and a destination, the first traffic encrypted at a network layer such that a secure network tunnel exists;
    determining whether a traffic exchange between the source and the destination is expected to be secured by at least one of the source or the destination at any of the network layer, a transport layer, or an application layer;
    generating a decision whether to secure the first session at the network layer based on whether the traffic exchange is expected to be secured or unsecured; and
    implementing the decision on second traffic exchanged between the source and the destination during the first session by at least forgoing encrypting the second traffic at the network layer based on the decision, wherein the second traffic is sent while the secure network tunnel no longer exists.

2. The method of claim 1, wherein the traffic exchange is expected to be unsecured at the network layer wherein implementing the decision comprises encrypting at least the second traffic at the transport layer or the application layer.

3. The method of claim 1, wherein the traffic exchange is expected to be secured at the transport layer or the application layer, wherein the decision is to forgo securing the first session, and wherein implementing the decision comprises sending the second traffic to the destination or the source without encrypting the second traffic at the network layer.

4. The method of claim 1, further comprising:
    storing session data based on a first attribute of the first session, the session data indicating the decision;
    receiving, during a second session that is between the source and the destination and that occurs after the first session, third traffic exchanged between the source and the destination;
    determining the session data based on a second attribute of the second session;
    determining the decision indicated in the session data; and
    implementing the decision on the third traffic.

5. The method of claim 4, wherein the first attribute comprises at least one of: an internet protocol address, a port number, or an application identifier, and wherein the session data is determined by at least matching the second attribute to at least one of the internet protocol address, the port number, or the application identifier.

6. The method of claim 4, wherein the session data is stored in a memory cache and is associated with a time attribute indicating a duration during which the session data remains applicable, and wherein the third traffic is received prior to an expiration of the time attribute.

7. The method of claim 1, wherein the decision is generated prior to reception of the second traffic by the network element, wherein implementing the decision comprises encrypting the second traffic at the transport layer or the application layer.

8. The method of claim 1, wherein the decision is generated prior to reception of the second traffic by the network element and is to forgo securing the first session and wherein implementing the decision comprises forgoing further encrypting the second traffic at any of the network layer, the transport layer, or the application layer.

9. The method of claim 1, further comprising:
    sending the first traffic after the first traffic is encrypted at the network layer; and
    receiving the second traffic after the decision is generated.

10. The method of claim 1, further comprising:
receiving the second traffic after the decision is generated.

11. A system comprising:
one or more processors; and
one or more memory storing instructions associated with a network element, wherein the instructions upon execution by the one or more processors, configure the network element to:
  encrypt first traffic in a first session between a source and a destination, the first traffic encrypted at a network layer such that a secure network tunnel exists;
  determine whether a traffic exchange between the source and the destination is expected to be secured by at least one of the source or the destination at any of the network layer, a transport layer, or an application layer;
  generate a decision whether to secure the first session at the network layer based on whether the traffic exchange is expected to be secured or unsecured; and
  implement the decision on at least second traffic exchanged between the source and the destination during the first session by at least forgoing encrypting the second traffic at the network layer based on the decision, wherein the second traffic is sent while the secure network tunnel no longer exists.

12. The system of claim 11, wherein the network element is included in the source or the network element and the source belong to a same private network, and wherein the first traffic and the second traffic are sent from the source or from the destination.

13. The system of claim 11, wherein the network element is included in the destination or the network element and the destination belong to a same private network, and wherein the first traffic and the second traffic are sent from the source or from the destination.

14. The system of claim 11, wherein determining whether the traffic exchange is expected to be secured comprises determining at least one of: whether header information of the first traffic indicates layer 3 or layer 7 encryption or whether the first traffic is exchanged via a port associated with encryption.

15. The system of claim 11, wherein determining whether the traffic exchange is expected to be secured comprises determining pre-stored data associated with an endpoint, wherein the endpoint is one of the source or the destination, wherein the pre-stored data indicates whether the endpoint uses encryption for traffic sent by the endpoint.

16. The system of claim 11, wherein determining whether the traffic exchange is expected to be secured comprises determining from content of a payload of the first traffic whether the payload is encrypted.

17. One or more computer-readable storage media storing instructions, that upon execution on a system that implements a network element, cause the network element to perform operations comprising:
  encrypting first traffic in a first session between a source and a destination, the first traffic encrypted at a network layer such that a secure network tunnel exists;
  determining whether a traffic exchange between the source and the destination is expected to be secured by at least one of the source or the destination at any of the network layer, a transport layer, or an application layer;
  generating a decision whether to secure the first session at the network layer based on whether the traffic exchange is expected to be secured or unsecured; and
  implementing the decision on at least second traffic exchanged between the source and the destination during the first session by at least forgoing encrypting the second traffic at the network layer based on the decision, wherein the second traffic is sent while the secure network tunnel no longer exists.

18. The one or more computer-readable storage media of claim 17, wherein the first traffic and the second traffic are received from the source, and wherein the operations further comprise:
  determining that the destination does not support encryption at the network layer, wherein the decision is to secure the first session, and wherein implementing the decision comprises forgoing sending at least the second traffic to the destination.

19. The one or more computer-readable storage media of claim 17, wherein the first traffic and the second traffic are received from the source, wherein the source is associated with a user, and wherein the operations comprise:
  receiving input of the user indicating that traffic sent via a port of the source is already secured, wherein the first traffic is determined to be secured based on being sent via the port, and wherein the decision is to forgo securing the first session.

20. The one or more computer-readable storage media of claim 17, wherein the first traffic and the second traffic are received from the source, wherein the source is associated with a user, and wherein the operations comprise:
  receiving input of the user indicating a first session attribute and that traffic associated with the first session attribute is already secured, wherein the first traffic is determined to be secured based on a match of a second session attribute of the first session with the first session attribute, and wherein the decision is to forgo securing the first session.

\* \* \* \* \*